United States Patent [19]

Duncan

[11] Patent Number: 5,145,903
[45] Date of Patent: Sep. 8, 1992

[54] ACRYLIC COMPOSITE MATERIALS
[75] Inventor: Helen Duncan, Bolton, England
[73] Assignee: Imperial Chemical Industries PLC, England
[21] Appl. No.: 501,036
[22] Filed: Mar. 29, 1990
[30] Foreign Application Priority Data Mar. 30, 1989 [GB] United Kingdom ............ 8907211

[51] Int. Cl.$^5$ ............................................. C08K 3/12
[52] U.S. Cl. ................................. 524/437; 523/513
[58] Field of Search ............... 523/171, 513; 524/437

[56] References Cited

U.S. PATENT DOCUMENTS

| | | | |
|---|---|---|---|
| 3,847,865 | 11/1974 | Duggins | 428/15 |
| 4,159,301 | 6/1979 | Buser et al. | 524/437 |
| 4,413,089 | 11/1983 | Gavin et al. | 524/437 |
| 4,829,103 | 5/1989 | Oda | 523/171 |
| 4,916,172 | 4/1990 | Hayashi | 523/171 |

FOREIGN PATENT DOCUMENTS 0064809 11/1982 European Pat. Off.
0151990 8/1985 European Pat. Off.
1493393 11/1977 United Kingdom.

*Primary Examiner*—Paul R. Michl
*Assistant Examiner*—Peter Szekely
*Attorney, Agent, or Firm*—Cushman, Darby & Cushman

[57] ABSTRACT

A fluid, filled, curable composition comprising an organic liquid which is polymerizable to form a solid polymer without the formation of any elimination products and from 20 to 70% by volume of alumina trihydrate filler characterized in that filler has a median particle size of between 5 and 30 microns, and preferably between 6 and 20 microns, and has an average aspect ratio of less than 2,5:1, preferably less than 2.0:1, and desirably less than 1.8:1.

The composition when cured provides shaped articles having improved mechanical properties and when used as a dispersion of low viscosity reduces the tendency for the composition to show color variations through the thickness of the sheet as exhibited using alumina trihydrate fillers of high aspect ratio.

8 Claims, No Drawings

ACRYLIC COMPOSITE MATERIALS

This invention relates to curable compositions containing at least 20% by volume of alumina trihydrate filler (hereinafter termed ATH) and to articles moulded from such compositions.

Curable compositions, reinforced with high concentrations of particulate fillers have been used for many years for the fabrication of articles with decorative, hard wearing surfaces such as kitchen work tops, sink units and wash basins. Alumina trihydrate has been used in many of these compositions because this filler not only enables the objective of obtaining a hard wearing surface to be achieved but it confers a high degree of fire retardancy on the article, when present at sufficiently high concentrations. Because of the closeness of its refractive index to that of some of the cured, polymeric materials it also enables a degree of translucency to be introduced, if desired. The level of physical and mechanical properties of articles moulded from these compositions has been found to be significantly dependent on the physical form of the ATH filler.

According to the present invention there is provided a fluid, filled, curable composition comprising an organic liquid which is polymerisable to form a solid polymer without the formation of any elimination products and from 20 to 70% by volume of alumina trihydrate filler characterised in that filler has a median particle size of between 5 and 30 microns, and preferably between 6 and 20 microns, and has an average aspect ratio of less than 2.5:1, preferably less than 2.0:1, and desirably less than 1.8:1.

Alumina trihydrate suitable for use in the invention cannot readily be obtained by grinding or milling of larger particle size material because it is not possible to achieve the required combination of median particle size and aspect ratio by such techniques. ATH of the physical dimensions required for use in this invention is preferably obtained via a precipitation process.

The curable component of the compositions may be any of those described in British Patent Specification No. 1 493 393 as organic liquids which are polymerisable to form a solid polymer without the formation of any elimination products. Materials which polymerise by addition polymerisation of vinyl, vinylidene, or other similar unsaturated monomers in the presence of free radical initiators are particularly preferred, and of these, methyl methacrylate, optionally, with copolymerisable monomers, finds the greatest utility in high quality, decorative articles because of the attractive surface finishes obtainable.

The fluid, curable component may be present in monomeric form or as a mixture with one or more preformed polymers. The polymer, if present, is conveniently the same as the polymer which will be produced by polymerisation of the monomer. However, the invention is not limited to such combinations of monomer and preformed polymer.

Useful mixtures of polymers and monomers include mixtures of non-reactive polymers in curable monomers and mixtures of reactive polymers in curable monomers. Typical examples of the former are poly(methyl methacrylate)/methyl methacrylate and poly(butyl acrylate)/methyl methacrylate. Typical examples of the latter are mixtures of unsaturated polyesters, vinyl or vinylidene group-terminated urethanes and methacrylic acid adducts of epoxy resins in each case in combination with ethylenically unsaturated monomers. Suitable curable compositions containing a reactive polymer are described in European Patent Publications 64809 and 151990.

Where the curable compositions used do not give rise to cross-linked products in their own right, for example, where the curable liquid is methyl methacrylate it is advantageous to include a polyfunctional curable material to obtain a cured article in which the matrix polymer is cross-linked.

Whatever curable system or combination of materials is used it is preferred that the fluid material of the composition contains a major proportion of methyl methacrylate.

For ease of fabrication the curable composition should have a sufficiently low fluidity to be readily pumpable because it is desirable that the composition be capable of being rapidly introduced into the moulds into which the shaped articles are to be produced.

If the fluid, curable composition is to be sold as such, that is as a dispersion which will be transported to the fabricators but which must be usable as a uniformly dispersed composition after a period of up to several months storage, it is necessary to ensure that the filler is dispersed in a state of stable deflocculation. In this state the filler particles, even if sedimented to the bottom of the dispersion container will be capable of being uniformly redispersed by mild agitation, such as rolling in drums. Such stably, deflocculated dispersions are obtainable by the inclusion in the fluid dispersion of a polymeric dispersant as described in British Patent No. 1 439 393. In general, the polymeric dispersants are defined as an amphipathic substance containing (a) at least one chain-like component of molecular weight at least 500 which is solvated by the polymerisable organic liquid (A) and is also solvated by, or is compatible with, the oligomeric or polymeric products which result throughout the course of the curing operation from the polymerisable organic liquid, and (b) one or more groupings which are capable of associating with, and effecting anchoring to the particles of the inorganic filler (B). The chain-like component is solvated by the polymerisable liquid or its curing products in the sense that, if this component were an independent molecule the polymerisable liquid or those products would be significantly better than theta-solvents for it; the nature of a theta-solvent is discussed in "Polymer Handbook" (ed. Brandrup and Immergut, Interscience, 1966) and in "Principles of Polymer Chemistry", Chapters 12-14 (Flory:Cornell, 1953). More simply, the polymerisable liquid may be described as being a "good" solvent for the chain-like component.

The use of ATH of the defined physical form provides a number of advantages. In the first place mechanical properties of mouldings produced from the dispersion, such as flexural strength and particularly impact strength are significantly improved. The filler imparts a higher level of fire retardancy (as indicated by oxygen index) than ATH fillers of larger particle size.

Accordingly there is also provided a composite article formed from a fluid, curable composition comprising an organic liquid which is polymerisable to form a solid polymer without the formation of elimination products and from 20 to 70% by volume of an alumina trihydrate filler having a median particle size between 5 and 30 microns, preferably between 5 and 20 microns, and an average aspect ratio of less than 2.5:1, preferably less than 2.0:1 and more desirably less than 1.8:1.

The use of the defined ATH fillers also permits the production of dispersions in which the filler particles remain substantially uniformly dispersed in the dispersion for at least a few hours, even though the dispersion may have a viscosity of less than 5 poise. Furthermore, dispersions of this fluidity have been observed to give rise to limited segregation of particles when an ATH of a high aspect ratio is used in rapid filling of a mould. This phenomenon can be observed visually by examining a cross-section cut through a moulded article. A decrease in orientation of high aspect ratio particles towards the centre of the section is indicated by an increase in whiteness at the centre of the section. This fault is avoided using the ATH filler of the present invention. That is, under conditions of viscosity and mould filling conditions which are otherwise the same as used for the high aspect ratio filler, the defined ATH filler gives mouldings substantially free from colour variation across a cross-section of the moulded article.

Accordingly there is also provided a composite article formed from a fluid, curable composition comprising an organic liquid which is polymerisable to form a solid polymer without the formation of elimination products and from 20 to 70% by volume of an alumina trihydrate filler having a median particle size between 5 and 30 microns, preferably between 6 and 20 microns, and an average aspect ratio of less than 2.5:1, preferably less than 2.0:1 and more desirably less than 1.8:1 and further characterised in that a section through the article shows a substantially uniform colour across the section.

In order to maximise the properties of the composition it is preferred that a very strong bond between the polymer matrix and the particles is achieved by the inclusion of a bonding agent of the type which contains one or more groups capable of interacting or associating with groups in the inorganic material, and also one or more groups which can copolymerise with, or otherwise graft on to, the polymer forming the matrix in the finished composite material.

Suitable bonding agents are in general substances containing groups which can form a multiplicity of ionic, covalent or hydrogen bonds with the particle, and also groups which can react to form bonds with the polymer matrix. Suitable groups for bonding to ATH particles are, for example, the oligomeric hydrolysis products of alkoxy silanes, chlorosilanes and alkyl titanates as well as the trivalent chromium complexes or organic acids.

Groups suitable for bringing about bonding with the polymer matrix are typically those which co-react with the polymerisable liquid during the polymerisation stage. Thus an interfacial bonding agent containing an ethylenically unsaturated group is suitable for use with addition polymerisation systems involving vinyl, vinylidene and similar unsaturated monomers. An agent containing an amino, an oxirane or a carboxyl group is suitable for use with epoxy-group-containing compounds. Examples of suitable interacial bonding agents include γ-methacryloxypropyl trimethoxy silane
γ-aminopropyl trimethoxysilane
γ-glycidyloxypropyl trimethoxysilane
vinyl triethoxysilane
vinyl triacetoxysilane
vinyl trichlorosilane
Acrylic and methacrylic acids and their metal salts
Methacrylatochromic chloride
Maleimidopropionic acid
Succinimidopropionic acid
4-Amonimethylpiperidine
Tetraisopropyl and tetrabutyl titanates The amounts of the interfacial bonding agent used are, in general those conventional in the art of polymeric materials reinforced with inorganic fillers. A suitable minimum usage for most applications is 0.001 g of bonding agent per square meter of filler particle surface area. If desired, a mixture of two or more interfacial bonding agents of the types described may be used.

The curable compositions of the invention may incorporate dyestuffs or pigments. These constituents may be dissolved or dispersed in the complete mixture of the polymerisable liquid, the finely divided inorganic filler and the polymeric dispersant, or, in the case of pigments, they may be added to that mixture as a preformed dispersion in the polymerisable liquid which has been prepared with the aid of a suitable pigment dispersant.

The curing of the curable compositions in the mould will be effected by methods known to those skilled in the art. For example, an addition polymerisable material will be polymerised using a free radical initiator chosen from those known to be effective for such purposes. The initiator chosen will depend on the polymerisation conditions to be employed but it is generally preferred to use mould temperatures of at least 50° C. to achieve rapid polymerisation cycles. Suitable free radical initiators under these conditions are benzoyl peroxide, azodiisobutyronitrile and bis(4-tertbutyl cyclohexyl) peroxydicarbonate.

The median particle size ($D_{50}$) of the ATH is measured on a Coulter Counter on a sample of the powder. The aspect ratio of the ATH is determined by measurements of the longest and shortest dimensions of a representative number of particles as viewed in a scanning electron microscope.

In the priority specification the values for average aspect ratio were determined on samples of the ATH powders used by measuring the longest and shortest dimensions of a representative number of particles as viewed in a scanning electron microscope. A more rigorous method of measurement has now shown that although the trend to improved physical properties and elimination of colour variation in shaped articles with decreasing aspect ratio is amply confirmed the actual average aspect ratio measurements differ from those given by the previous method of measurement.

In the present specification and claims the aspect ratios measured and referred to are those measured by the following method.

Cured products made from the dispersions of the invention are prepared as a plaque about 5 mm thick. The plaque is sectioned through the thickness, i.e. in a plane perpendicular to the plaque surfaces. The cut surface is inspected for evidence of colour variation and is then abraded using silicon carbide grit paper (Grade 1000). The abraded surface is then polished with diamond paste and coated with gold. The surface was examined using scanning electron miscroscopy at a magnification of 1000 using the back-scatter method to obtain contrast between the filler and the resin. In order to reduce the statistical variations 10 separate fields of view are chosen across the polished section so that a total of about 4000 particles can be measured for the determination of the average aspect ratio for a given product. The images of the 10 fields of view are analysed by a Kontron SEM-IPS Image Analyser measuring both the maximum and minimum dimensions of each of the particles. Because of the magnification used on the scanning electron microscope and the limitations in measuring small particles on the Kontron, measurements on all particles having a maximum dimension of less than 2.5 microns are not included when calculating the average aspect ratio.

The mechanical properties of the sheet reported in the Examples were determined as follows.

Impact Strength

Charpy unnotched bar (size 50 mm × 6.5 mm × 5.5 mm)
Machine—Zwick 5102 Impactor (0.5J hammer)
Dimensions as specified in ISO 179.

Flexural Strength and Modulus

Machine Instron 4301—three point bend rig.
Sample size 130 mm × 12 mm × 5.0.
Measured according to ISO 178.

The invention is illustrated by the following examples.

EXAMPLE 1

A series of curable compositions were made up by dispersing 63 parts by weight of various grades of alumina trihydrate in 34 parts of methyl methacrylate using 0.125 parts of a 95:5 copolymer of methyl methacrylate and dimethylaminoethyl methacrylate by simple stirring by hand. The dispersion additionally contained 0.3 parts ethylene-glycol dimethacrylate, 0.01 parts γ-methacryloxypropyl trimethoxy silane and 100 ppm (on monomer) of Topanol A stabiliser (2,4-dimethyl-6-tert-butyl phenol). All the compositions were adjusted to a standard viscosity by the inclusion of a high molecular weight homopolymer of methyl methacrylate ('Diakon' LS600 having a reduced viscosity of 2.5-3.0 measured on a 1% solution in chloroform). The standard viscosity chosen was a pour time of 90 seconds at 25° C. (using British Standard 3900 A6 with a number 5 cup). The 'Diakon' LS600 was added as a solution in methyl methacrylate, the monomer being part of the total of 34 parts of methyl methacrylate.

A glass cell was prepared with glass treated with a 5% (by weight) solution of octadecyltrichlorosilane in MMA. 6 mm nitrile rubber gasket was used between the glass to seal the edges.

The dispersion was catalysed using 1.6% (on MMA) 'Perkadox' 16 (Bis(4-tert butylcyclohexyl) peroxydicarbonate). The catalysed dispersion was rolled for 20 minutes to allow the solid peroxide to dissolve.

The dispersion was subjected to a vacuum of a maximum of 28 mm Hg and reduced manually to prevent boiling. This operation removed air which had become incorporated into the dispersion by rolling.

The dispersion was poured into the cell and sealed. This was placed in a waterbath at 65° C. for 35 minutes and then transferred to a 95° C. bath for a further 30 minutes to complete the polymerisation.

This produces a casting with good gloss surfaces which splits away from the glass plates relatively easily.

The procedure described above was used to prepare sheets containing ATH products having the following dimensional characteristics.

|   | Average Particle Size Micron | Average Aspect Ratio | |
|---|---|---|---|
|   |   | Old Method | Present Method |
| A | 10 | 1.48 ±0.32 | 1.68 ±0.56 |
| B | 11 | 3.83 ±1.84 | 2.12 ±0.86 |
| C | 7  | 4.77 ±1.08 | 3.29 ±2.24 |
| D | 90 | 3.81 ±2.21 | 1.71 ±0.52 |
| E | 28 | <3.5 | |

This table gives a comparison between results obtained using the method of the priority specification and the method described in the present specification.

The properties of composite sheets containing 63% by weight of the above variants of ATH were as follows.

|   | Flexural Strength (MPa) | Flexural Modulus (GPa) | Impact Strength (kJm$^{-2}$) | Cross-Sectional Colour Uniformity |
|---|---|---|---|---|
| A | 90.2 | 8.6 | 5.0 | Excellent |
| B | 70.3 | 9.2 | 2.6 | Fair |
| C | 74.1 | 8.6 | 3.4 | Bad |
| D | 52.6 | 8.5 | 2.0 | Excellent |
| E | 67.1 | 8.9 | 2.5 | Excellent |

These results indicate the excellent level of properties obtained by using a grade of ATH having the defined particulate characteristics (Sheet A). Sheet E also within the invention, gave a good colour uniformity but a lower level of flexural modulus and impact strength. Variants of ATH not within the invention, as exemplified by sheets B, C and D give markedly inferior results in one or more properties.

EXAMPLE 2

The procedure of Example 1 was followed in evaluating three further samples of ATH powder of differing particle dimensions. The results are given below.

| Sample | Average Particle Size (Micron) | Average Aspect Ratio Present Method | Cross Sectional Colour Uniformity |
|---|---|---|---|
| F | 8 | 3.54 ±2.51 | Bad |
| G | 9 | 2.01 ±0.68 | Good |
| H | 8 | 1.67 ±0.46 | Excellent |

The physical properties of cured sheets were as follows.

| Sample | Flexural Strength (MPa) | Flexural Modulus (GPa) | Impact Strength kJm$^{-2}$ |
|---|---|---|---|
| F | 73.2 | 11.1 | 2.3 |
| G | 84.5 | 9.2 | 3.9 |
| H | 84.8 | 9.1 | 4.7 |

EXAMPLE 3

The procedure of Example 1 was followed to produce a composition containing 63 parts by weight of two types of ATH filler (as detailed below) dispersed in a polyurethane resin marketed by ICI Chemical and Polymers Ltd as 'Modar' 835 consisting of a mixture of about 50% by weight of methyl methacrylate in a polyurethane polymethacrylate in which the polymethacrylate is component is provided by hydroxyethylmethacrylate.

1.25% by weight of dispersing agent was used as in Example 1. The mixture was rolled with 2 parts of 'Perkadox' 16 (Bis(4-tert butyl cyclohexyl) peroxydicarbonate for 20 minutes. Vacuum was applied as described in Example 1 and the mixture was then polymerised in a glass cell as in Example 1 at a temperature of 65° C. for 35 minutes and then at 95° C. for a further 30 minutes.

The resulting costing was split from the glass plates and sectioned to examine for the presence of variation in colour.

A first plaque produced using ATH sample C produced a distinct segregation of particles and a variation in colour whereas a plaque produced under the same conditions except in that ATH sample A was used was free from colour variation.

EXAMPLE 4

The procedure of Example 1 was followed to produce a plaque containing 40% by weight of ATH in a polyester matrix. The polyester used was Crystic 196 LV, a low viscosity unsaturated polyester in styrene supplied by Scott Bader Ltd. In this case 1 part by weight of 'Perkadox' 16 was used as catalyst but the process conditions otherwise were as in Example 3. Products were produced using ATH samples A and C as used in Example 1. Charpy impact strength measurements gave values of 4.6 kJm$^{-2}$ for sample A and 3.9 kJm$^{-2}$ for sample C.

I claim:

1. A fluid, filled, curable composition comprising an organic liquid which is polymerisable to form a solid polymer without the formation of elimination products, said organic liquid being selected from methyl methacrylate and mixtures of methyl methacrylate with reactive or non-reactive polymers and from 20 to 70% by volume of alumina trihydrate filler, said filler having a median particle size of between 5 and 30 microns and an average aspect ratio of less than 2.5:1, the viscosity of the composition being less than 5 poise at ambient temperature and the filler being capable of being substantially uniformly dispersed in the organic liquid while the composition is cured.

2. A fluid, filled, curable composition according to claim 1 wherein the alumina trihydrate has an average aspect ratio of less than 2.0:1.

3. A fluid, filled, curable composition according to claim 1 wherein the average aspect ratio is less than 1.8:1.

4. A fluid, filled curable composition according to any one of claims 1 to 3 in which the median particle size is between 6 and 20 microns.

5. A fluid, filled, curable composition according to claim 1 wherein the filler particles are maintained in a state of stably deflocculated dispersion in the polymerisable organic liquid by the presence of a polymeric dispersant comprising (a) at least one chain-like component of molecular weight at least 500 which is solvated by the polymerisable organic liquid and is also solvated by, or is compatible with, the oligomeric or polymeric products which result throughout the course of the curing operation form the polymerisable organic liquid, and (b) one or more groupings which are capable of associating with, and effecting anchoring to the particles of the inorganic filler.

6. A composite article formed from a fluid, curable composition according to claim 1 wherein the article is substantially free from color variation across a cross-section through the molded article.

7. A composite article according to claim 6 in which the aspect ration of the filler is less than 1.8:1.

8. A composite article according to claim 6 in which the median particle size is between 6 and 20 microns.

* * * * *